United States Patent [19]

Hajek et al.

[11] 4,224,417

[45] Sep. 23, 1980

[54] HIGH MOLECULAR WEIGHT POLYAMINES AND THEIR USE IN PREPARATION OF POLYURETHANE RESINS

[75] Inventors: Manfred Hajek, Cologne; Kuno Wagner; Friedrich Möller, both of Leverkusen; Peter Vehlewald, Leichlingen, all of Fed. Rep. of Germany

[73] Assignee: Bayer Aktiengesellschaft, Leverkusen, Fed. Rep. of Germany

[21] Appl. No.: 52

[22] Filed: Jan. 2, 1979

Related U.S. Application Data

[60] Division of Ser. No. 909,158, May 24, 1978, abandoned, which is a continuation of Ser. No. 728,347, Sep. 30, 1976, abandoned.

[30] Foreign Application Priority Data

Oct. 17, 1975 [DE] Fed. Rep. of Germany ....... 2546536

[51] Int. Cl.³ ..................... C08G 18/32; C08G 18/14; C07D 273/01
[52] U.S. Cl. ................................... 521/166; 521/164; 528/60; 528/61; 528/62; 528/64; 528/73; 260/326.25; 544/401; 546/188; 560/25; 560/115; 560/158
[58] Field of Search ................. 521/164, 166; 528/60, 528/64, 73, 61, 62

[56] References Cited

U.S. PATENT DOCUMENTS

| | | | |
|---|---|---|---|
| 3,635,908 | 1/1972 | Vogt et al. | 528/60 |
| 3,932,357 | 1/1976 | Schmitt et al. | 528/64 |
| 3,941,753 | 3/1976 | Brinkmann et al. | 528/73 |
| 4,108,842 | 8/1978 | König et al. | 528/61 |
| 4,150,213 | 4/1979 | Hocker et al. | 528/73 |

FOREIGN PATENT DOCUMENTS 2356213 5/1975 Fed. Rep. of Germany.

*Primary Examiner*—H. S. Cockeram
*Attorney, Agent, or Firm*—Gene Harsh; Joseph C. Gil

[57] ABSTRACT

The invention relates to new polyamines, preferably containing polyether segments, a process for their preparation and their use as starting components for the production of polyurethane resins. The process involves producing ketimines, aldimines or enamines containing hydroxyl groups by reacting a hydroxyl amine with an aldehyde or ketone and removing the water by product. The ketimine, aldimine, or enamine is then reacted with an NCO prepolymer wherein the hydroxyl group of the material reacts with the isocyanate group without disturbing the blocked amine. This polyaddition product is then hydrolyzed to unblock the high molecular weight polyamine.

3 Claims, No Drawings

HIGH MOLECULAR WEIGHT POLYAMINES AND THEIR USE IN PREPARATION OF POLYURETHANE RESINS

This is a division of application Ser. No. 909,158 filed May 24, 1978, now abandoned, which itself is a continuation of our application Ser. No. 728,347, filed Sept. 30, 1976, and now abandoned.

BACKGROUND OF THE INVENTION

Beside polyols, polyamines are the most important reactants for the isocyanate polyaddition process. The urea linkages formed when amino groups are added to isocyanates result in high molecular weight compounds which have interesting commercial properties. Polyfunctional amines may also be used as mixtures with other reactants for isocyanates, for example, polyols. The course of the reaction and the properties of the end product can be determined within wide limits by adjusting the proportions of the components in the mixture.

Whereas low molecular weight polyamines are easily prepared on an industrial scale and a wide choice is therefore available, the problem of preparing higher molecular weight diamines and polyamines has not hitherto been solved satisfactorily. This is partly because the processes employed in low molecular weight chemistry for synthesizing amines cannot easily be applied to higher molecular weight compounds and partly because the preparation of suitable high molecular weight starting compounds also often leads to difficulties.

It is therefore an object of the present invention to provide a simple and reproducible process for the preparation of higher molecular weight diamines and polyamines using steps of chemical synthesis which are easily carried out in practice.

DESCRIPTION OF THE INVENTION

This problem is solved by the process of the present invention since it has been found that the reactivity of the amino group of amino alcohols towards isocyanate groups can be reduced by suitable choice of protective groups to such an extent that the reaction of the blocked amino alcohols with isocyanate prepolymers is virtually restricted to the hydroxyl group, resulting in the formation of urethanes. The blockage of the amino group is subsequently removed in another reaction step to yield the desired high molecular weight polyamines.

The present invention thus relates to a process for the preparation of higher molecular weight polyamines which is characterized in that ketimines, aldimines or enamines (compare Robert W. Layer, The Chemistry of Imines, Chemical Reviews, page 489 and following, Vol 63 (1963); Monographie "Enamines: Synthesis, Structure and Reactions," edited by A. Gilbert Cook, published by Marcel Dekker, New York and London, 1969) containing hydroxyl groups in the amine moieties are reacted with compounds containing isocyanate end groups which have been prepared by the reaction of polyols having a molecular weight of between about 200 to about 10,000 with diisocyanates, and the resulting polyketimines, polyaldimines or polyenamines are decomposed hydrolytically and the carbonyl compound liberated in the reaction is removed.

The invention also relates to the polyamines which can be obtained by the process of the invention. These polyamines are represented by the general formula

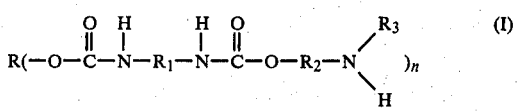

in which
n represents an integer of between 2 and 10,
R represents an n-valent organic group such as can be obtained by the removal of n hydroxyl groups from a polyhydroxyl compound which has an average molecular weight of between about 200 and about 10,000 and may also contain urethane groups,
$R_1$ represents an alkylene, cycloalkylene, arylene or aralkylene group containing 2 to 15 carbon atoms,
$R_2$ represents an alkylene, cycloalkylene, arylene or aralkylene group with from 2 to 15, preferably 6 to 12, carbon atoms which may contain an —O— or

group and
$R_3$ represents hydrogen, or an alkyl or cycloalkyl group with 1 to 9 carbon atoms, or an alkylene group which together with $R_2$ and —NH— forms a 5- or 6-membered ring.

The polyamines of the general formula (I) are obtained by hydrolysis of compounds of the general formulae (II a)

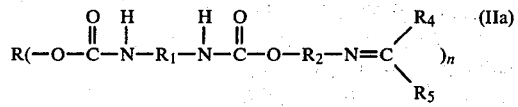

or (II b)

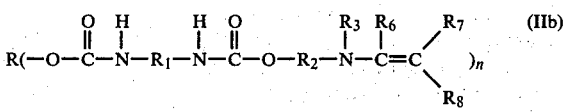

in which n, R, $R_1$, $R_2$ and $R_3$ have the meanings specified above. The groups $R_4$ to $R_8$ represent alkyl, cycloalkyl, aryl and aralkyl groups with from 1 to 15 and preferably 1 to 7 carbon atoms or $R_4$ and $R_5$ together or $R_6$ and $R_8$ together form a 5- to 12-membered ring and-/or $R_4$, $R_6$ and/or $R_7$ represent hydrogen atoms.

The polyaldimines, polyketimines or polyenamines required for the process according to the invention are obtained by reaction of isocyanate prepolymers of the general formula

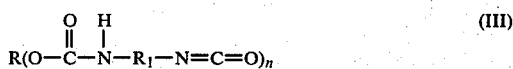

with ω-hydroxymonoaldimines, -ketimines or -enamines of the general formula

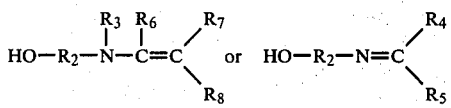

wherein $R_2$ to $R_8$ have the meanings specified above.

The isocyanate prepolymers (III) used for the process according to the invention are prepared by basically known methods of reacting polyhydroxyl compounds with diisocyanates.

Suitable polyhydroxyl compounds are in particular polyethers with a molecular weight of from about 200 to about 10,000, preferably 1000 to 6000, containing at least 2, generally 2 to 8 and preferably 2 to 3 hydroxyl groups.

The hydroxyl polyethers which may be used in the invention are known per se and may be prepared, for example, by polymerization of epoxides such as ethylene oxide, propylene oxide, butylene oxide, tetrahydrofuran, styrene oxide or epichlorohydrin. The polymerization may be of the oxides themselves, for example, in the presence of boron trifluoride, or by addition reactions of these epoxides, either as mixtures or successively, to starting components containing reactive hydrogen atoms. Such starting compounds include water, alcohols or amines, e.g. ethylene glycol, propylene-1,3- or -1,2-glycol, trimethylolpropane, 4,4'-dihydroxydiphenylpropane, aniline, ammonia, ethanolamine or ethylenediamine. Sucrose polyethers such as those described, for example, in German Auslegeschriften Nos. 1,176,358 and 1,064,938 may also be used. It is in many cases preferred to use polyethers which contain predominantly primary hydroxyl groups (up to 90% by weight, based on all the hydroxyl groups present in the polyether). Polyethers which have been modified with vinyl polymers, for example, the compounds obtained by the polymerization of styrene and acrylonitrile in the presence of polyethers as described in U.S. Pat. Nos. 3,383,351; 3,304,273; 3,523,093 and 3,110,695 and German Pat. No. 1,152,536 are also suitable. Polybutadienes containing hydroxyl groups may also be used.

Polythioethers and polyacetals are also suitable for the process of the invention. Polyesters may also be used if the polyamines which are the subject of the present invention carry secondary amino groups.

Suitable polyesters with hydroxyl groups include, for example, the reaction products of polyhydric, preferably dihydric alcohols to which trihydric alcohols may be added, with polybasic, preferably dibasic carboxylic acids. If desired, the corresponding polycarboxylic acid anhydrides or corresponding polycarboxylic acid esters of lower alcohols or mixtures thereof may be used instead of the free polycarboxylic acids for preparing the polyesters. The polycarboxylic acids may be aliphatic, cycloaliphatic, aromatic and/or heterocyclic and they may be substituted, for example, by halogen atoms, and/or may be unsaturated. The following are examples of suitable polycarboxylic acids: Succinc acid; adipic acid; azelaic acid; sebacic acid; phthalic acid; isophthalic acid; trimellitic acid; phthalic acid anhydride; tetrahydrophthalic acid anhydride; hexahydrophthalic acid anhydride; endomethylene tetrahydrophthalic acid anhydride; glutaric acid anhydride; maleic acid; maleic acid anhydride; fumaric acid; dimethylterephthalate and bis-glycol terephthalate. Suitable polyhydric alcohols include, for example, ethylene glycol; propylene-1,2- and -1,3-glycol; butylene-1,4- and -2,3-glycol; hexane-1,6-diol; octane-1,8-diol; neopentyl glycol; cyclohexane dimethanol (1,4-bis-hydroxymethylcyclohexane); 2-methyl-1,3-propanediol; glycerol; trimethylolpropane; hexane-1,2,6-triol; butane-1,2,4-triol; trimethylolethane; pentaerythritol; quinitol; mannitol and sorbitol; methyl glycoside; diethylene glycol; triethylene glycol; tetraethylene glycol; polyethylene glycols; dipropylene glycol; polypropylene glycols; dibutylene glycol and polybutylene glycols. Polyesters of lactones such as $\epsilon$-caprolactone or hydroxycarboxylic acids such as $\omega$-hydroxycaproic acid, may also be used.

Among the polythioethers which should be particularly mentioned are the condensation products obtained by reacting thiodiglycol on its own and/or with other glycols, dicarboxylic acids, formaldehyde, aminocarboxylic acids or amino alcohols. The products obtained are polythio mixed ethers, polythioether esters or polythioether ester amides, depending on the co-components.

Suitable polyacetals include, for example, the compounds which can be prepared from glycols such as diethylene glycol, triethylene glycol, 3,4'-dioxethoxydiphenyldimethyl methane, hexanediol and formaldehyde. Suitable polyacetals may also be obtained by the polymerization of cyclic acetals.

Suitable polycarbonates with hydroxyl groups include those known per se which can be obtained, for example, by the reaction of diols such as propane-1,3-diol, butane-1,4-diol and/or hexane-1,6-diol, diethylene glycol, triethylene glycol or tetraethylene glycol with diaryl carbonates such as diphenylcarbonate or phosgene.

The isocyanates used as starting components for the preparation of the isocyanate prepolymers required according to the invention may be any number of known isocyanates but are preferably bifunctional aliphatic, cycloaliphatic, araliphatic, aromatic or heterocyclic isocyanates of the kind which have been described, for example, by W. Siefken in Justus Liebigs Annalen der Chemie, 562, pages 75 to 136. The following are specific examples: Ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and -1,4-diisocyanate and any mixtures of these isomers; 1-isocyanato-3,3,5-trimethyl-5-isocyanatomethyl-cyclohexane as described in German Auslegeschrift No. 1,202,785 and U.S. Pat. No. 3,401,190; hexahydrotolylene-2,4- and -2,6-diisocyanate and any mixtures of these isomers; hexahydro-1,3- and/or 1,4-phenylene diisocyanate; perhydro-2,4'- and/or 4,4'-diphenylmethane diisocyanate; phenylene-1,3- and -1,4-diisocyanate; tolylene-2,4- and -2,6-diisocyanate and any mixtures of these isomers; diphenylmethane-2,4'- and/or 4,4'-diisocyanate and naphthylene-1,5-diisocyanate.

The following are examples of hydroxyamines which are suitable for the process of the present invention: 2-aminoethanol; 2-methylaminoethanol; 1-amino-2-propanol; 3-amino-1-propanol; 4-amino-1-butanol; 4-amino-2-butanol; 2-amino-2-methyl-propanol; 5-amino-1-pentanol and 6-amino-1-hexanol.

Particularly suitable, however, are those hydroxyamines in which the two functional groups are separated by at least 6 atoms or by a ring. These include 7-amino-1-heptanol; 10-amino-1-decanol; 12-amino-1-dodecanol; 4-(2-aminoethyl)-(2-hydroxyethyl)-benzene; 4-$\beta$-hydroxyethylaminobenzene and N-$\beta$-hydroxyethyl-piperazine. Hydroxyamines having hetero atoms as represented by the following formulae may also be used $$HO-(CH_2)_2-O-(CH_2)_3-NH_2$$

$$HO-(CH_2)_4-O-(CH_2)_3-NH_2$$

$$HO-(CH_2)_5-O-(CH_2)_3-NH_2$$

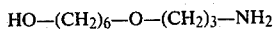

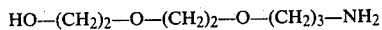

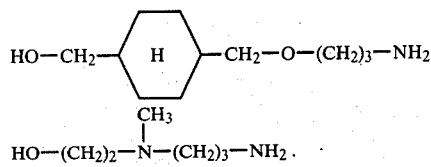

$HO-(CH_2)_2-\overset{\underset{\displaystyle CH_3}{|}}{N}-(CH_2)_3-NH_2$.

These are preferably obtained by the monoaddition of acrylonitrile to glycols or to N-substituted hydroxyamines followed by reduction.

The following aldehydes, for example, may be used for blocking the NH functional group: Acetaldehyde; propionaldehyde; n-butyraldehyde; isobutyraldehyde; n-valeraldehyde; isovaleraldehyde; caproic aldehyde; n-heptanal; 3-formyl-heptane; formylcyclohexane; 1- and 2-methyl-4-formyl-cyclohexane-(1), phenyl acetaldehyde; 3-phenylpropionaldehyde; benzaldehyde; chlorobenzaldehydes; methylbenzaldehydes and cinnamaldehyde.

The following are examples of suitable ketones: Acetone; methyl ethyl ketone; methyl-n-propyl ketone; methyl-isobutyl ketone; diethyl ketone; methyl-n-amylketone; diisobutyl ketone; methyl-t-butyl-ketone; methyl-n-heptyl ketone; acetonyl acetone; acetophenone; propionphenone; cyclopentanone; cyclohexanone; 1-methylcyclohexanone-(2); 1-cyclohexyl cyclohexanone-(2); cyclohexadione-(1,4); cyclododecanone; hydrindone and tetralone.

Using the above mentioned reactants ketimines aldimines and/or enamines are obtained according to processes known in the art (compare Robert W. Layer, The Chemistry of Imines, Chemical Reviews, page 489 and following, vol 63 (1963); Monographie "Enamines: Synthesis, Structure and Reactions," edited by A. Gilbert Cook, published by Marcel Dekker, New York and London, 1969).

The isocyanate prepolymers are prepared by methods known per se, preferably employing temperatures of between about 10° C. and about 140° C. The NCO-/OH equivalent ratio of the reactants employed is generally between about 1.5:1 and about 6:1, preferably between 2:1 and 4:1. The OH/NCO reaction may be accelerated if desired by the addition of suitable catalysts for this reaction. The excess of monomeric diisocyanate is preferably subsequently removed partly or completely in known manner.

The subsequent reaction of the resulting isocyanate prepolymers with the N-blocked amino alcohols is also carried out by methods conventionally employed in isocyanate chemistry. One preferred method, in which all unwanted side reactions are substantially suppressed, consists of continuously adding the isocyanate prepolymer to the α,ω-hydroxyamines with blocked amino group at temperatures of between about 20° C. and about 120° C., preferably between 20° C. and 60° C., with vigorous stirring. Catalysts may also be used for this reaction if desired. The two reactants are preferably employed in a stoichiometric ratio of 1:1 (based on isocyanate and hydroxyl). A slight excess of hydroxyl compound may be used if desired.

The resulting blocked polyamines are converted into the free polyamines according to the invention by hydrolysis. Removal of the carbonyl compounds may be carried out, for example, by treating the blocked polyamine with water or with a water/solvent mixture at temperatures between 20° C. and 120° C. and then distilling off the carbonyl compound and excess water and, if necessary, solvent at a reduced pressure and elevated temperature.

The preferred method, however, consists of injecting steam at elevated temperature (about 100° to 130° C.) into the blocked polyamine and then freeing the resulting polyamine from residual water at reduced pressure when the reaction has been completed.

The resulting prepolymers with amino end groups can then be used for the isocyanate polyaddition process either alone or as mixtures with polyols and/or other active hydrogen containing compounds.

The compounds according to the invention may also be used for various condensation reactions, for example, with polycarboxylic acids or polycarboxylic acid derivatives or formaldehyde, e.g. for the preparation of polyamides, polyester amides and cross-linked polyhexahydrotriazines.

The preferred field of application of the polyamines according to the invention lies in the production of polyurethane resins, in particular foams. For this purpose, they may, if desired, be used in combination with higher molecular weight polyhydroxyl compounds, for example, of the kind already described above, and/or with low molecular weight chain lengthening agents, in the reaction with polyisocyanates.

The chain lengthening agents which may be used are compounds with a molecular weight of from about 32 to about 400 which contain at least two hydrogen atoms capable of reacting with isocyanates. The following are examples of such compounds: Ethylene glycol; propylene-1,2- and -1,3-glycol; butylene-1,4- and -2,3-glycol; pentane-1,5-diol; hexane-1,6-diol; octane-1,8-diol; neopentyl glycol; 1,4-bis-hydroxymethyl-cyclohexane; 2-methyl-propane-1,3-diol; glycerol; trimethylolpropane; hexane-1,2,6-triol; trimethylolethane; pentaerythritol; quinitol; mannitol and sorbitol; diethylene glycol; triethylene glycol; tetraethylene glycol; polyethylene glycols with a molecular weight of up to 400; dipropylene glycol; polypropylene glycols with a molecular weight of up to 400; dibutylene glycol; polybutylene glycols with a molecular weight of up to 400; 4,4'-dihydroxydiphenylpropane; dihydroxymethyl hydroquinone; ethanolamine; diethanolamine; triethanolamine; 3-aminopropanol; ethylene diamine; 1,3-diaminopropane; 1-mercapto-3-aminopropane; 4-hydroxy- or 4-aminophthalic acid; succinic acid; adipic acid; hydrazine; N,N'-dimethylhydrazine and 4,4'-diaminodiphenylmethane.

Suitable reactants for the polyamines of the invention, apart from the diisocyanates already mentioned above, include the following: Triphenylmethane-4,4',4''-triisocyanate, polyphenyl-polymethylene-polyisocyanates of the kind described, for example, in British Pat. Nos. 874,430 and 848,671 which can be obtained by aniline-formaldehyde condensation followed by phosgenation; m- and p-isocyanatophenylsulphonylisocyanates according to U.S. Pat. No. 3,454,606; perchlorinated aryl polyisocyanates such as those described, for example, in German Auslegeschrift No. 1,157,601 (U.S. Pat. No. 3,277,138); polyisocyanates having carbodiimide groups as described in German Pat. No. 1,092,007 (U.S. Pat. No. 3,152,162); the diisocyanates described in U.S. Pat. No. 3,492,330; polyisocyanates with allophanate groups as described e.g. in British Pat. No. 994,890; Belgian Pat. No. 761,626 and published Dutch patent application No. 7,102,524; polyisocyanates with isocyanurate groups as described e.g. in U.S. Pat. No. 3,001,973; German Pat. Nos. 1,022,789; 1,222,067 and 1,027,394 and German Offenlegungsschriften Nos. 1,929,034 and 2,004,048; polyisocyanates with urethane groups as described e.g. in Belgian Pat. No. 752,261 and U.S. Pat. No. 3,394,164; polyisocyanates having acylated urea groups according to German Pat. No. 1,230,778; polyisocyanates with biuret groups as described e.g. in German Pat. No. 1,101,394 (U.S. Pat. Nos. 3,124,605 and 3,201,372) and British Pat. No. 889,050; polyisocyanates prepared by telomerization reactions as described e.g. in U.S. Pat. No. 3,654,106; polyisocyanates having ester groups, for example, those mentioned in British Pat. Nos. 965,474 and 1,072,956; U.S. Pat. No. 3,567,763 and German Pat. No. 1,231,688; reaction products of the above-mentioned isocyanates with acetals in accordance with German Pat. No. 1,072,385 and polyisocyanates containing polymeric fatty acid groups according to U.S. Pat. No. 3,455,883.

The distillation residues still containing isocyanate groups from the commercial production of isocyanates may also be used, if desired as solutions in one or more of the above-mentioned polyisocyanates. Any mixtures of the above-mentioned polyisocyanates may also be used.

When producing foams from the polyamines of the present invention, water and/or readily volatile organic substances are used as blowing agents. The following are examples of suitable organic blowing agents: Acetone; ethyl acetate; halogenated alkanes such as methylene chloride; chloroform; ethylidene chloride; vinylidene chloride; monofluorotrichloromethane; chlorodifluoromethane; and dichlorodifluoromethane; also butane, hexane, heptane and diethylether. The effect of a blowing agent can also be obtained by the addition of compounds which decompose at temperatures above room temperature with the liberation of gases such as nitrogen, e.g. azo compounds such as azoisobutyric acid nitrile. Other examples of blowing agents and detals concerning the use of blowing agents may be found in Kunststoff-Handbuch, Volume VII, published by Viewag and Höchtlen, Carl-Hanser-Verlag, Munich 1966, e.g. on pages 108 and 109, 453 to 455 and 507 to 510.

Catalysts may often be advantaeously used. Suitable catalysts are known per se, for example, tertiary amines such as triethylamine; tributylamine; N-methylmorpholine; N-ethylmorpholine; N-cocomorpholine, N,N,N',N'-tetramethylethylenediamine; 1,4-diaza-bicyclo-(2,2,2)-octane; N-methyl-N'-dimethyl-aminoethyl-piperazine; N,N-dimethylbenzylamine; bis-(N,N-diethylaminoethyl)-adipate; N,N-diethylbenzylamine; pentamethyldiethylene triamine; N,N-dimethylcyclohexylamine; N,N,N',N'-tetramethyl-1,3-butanediamine; N,N-dimethyl-β-phenylethylamine; 1,2-dimethylimidazole and 2-methylimidazole. The known Mannich bases obtained from secondary amines such as dimethylamine, and aldehydes, preferably formaldehyde; or ketones such as acetone, methyl ethyl ketone or cyclohexanone; and phenols such as phenol, nonylphenol or bis-phenol may also be used as catalysts.

The following are examples of tertiary amines having isocyanate-reactive hydrogen atoms which may be used as catalysts: Triethanolamine; triisopropanolamine; N-methyl-diethanolamine; N-ethyl-diethanolamine; N,N-dimethylethanolamine and their reaction products with alkylene oxides such as propylene oxide and/or ethylene oxide.

Silaamines having carbon-silicon bonds may also be used as catalysts, for example, compounds described in German Pat. No. 1,229,290 (corresponding to U.S. Pat. No. 3,620,984), such as 2,2,4-trimethyl-2-silamorpholine or 1,3-diethylaminomethyl-tetramethyl-disiloxane.

Other suitable catalysts include basic nitrogen compounds such as tetraalkylammonium hydroxides; alkali metal hydroxides such as sodium hydroxide; alkali metal phenolates such as sodium phenolate and alkali metal alcohols such as sodium methylate. Hexahydrotriazines may also be used as catalysts.

Organic metal compounds may also be used as catalysts according to the invention. These particularly include organic tin compounds.

The organic tin compounds used are preferably divalent tin salts of carboxylic acids, such as tin(II) acetate; tin(II) octoate; tin(II) ethyl hexoate and tin(II) laurate, and the tetravalent tin compounds such as dibutyl tin oxide; dibutyl tin dichloride, dibutyl tin diacetate; dibutyl tin dilaurate; dibutyl tin maleate or dioctyl tin diacetate. The above mentioned catalysts may, of course, also be used as mixtures.

Other examples of catalysts which may be used according to the invention and the action of the catalysts have been described in Kunststoff-Handbuch, Volume VII, published by Vieweg and Höchtlen, Carl-Hanser-Verlag, Munich 1966, e.g. on pages 96 to 102.

The catalysts are generally used in a quantity of between about 0.001 and 10% by weight, based on the polyamine according to the invention.

Surface active additives such as emulsifiers and foam stabilizers may also be used. Sodium salts of ricinoleic sulphonates or salts of fatty acids with amines such as oleic acid diethylamine or stearic acid diethanolamine, for example, are suitable emulsifiers. Alkali metal or ammonium salts of sulphonic acids such as dodecylbenzene sulphonic acid or dinaphthylmethane disulphonic acid or of fatty acids such as ricinoleic acid or of polymeric fatty acids may also be used as surface-active additives.

The most important foam stabilizers are polyether siloxanes, especially those which are water-soluble. These compounds generally have a polydimethylsiloxane group attached to a copolymer of ethylene oxide and propylene oxide. Foam stabilizers of this kind have been described, for example, in U.S. Pat. Nos. 2,834,748; 2,917,480 and 3,629,308.

Reaction retarders may also be used according to the invention, for example, compounds which are acidic in reaction such as hydrochloric acid or organic acid halides. Other additives which may be used include cell regulators of the kind known per se such as paraffins or fatty alcohols or dimethylpolysiloxanes; pigments, dyes; flame-retarding agents known per se such as tris-chloroethyl phosphate, tricresyl phosphate, ammonium phosphate and ammonium polyphosphate; stabilizers against ageing and weathering; plasticizers; fungistatic and bacteriostatic substances and fillers such as barium sulphate, kieselguhr, carbon black or whiting.

Other examples of surface active additives and foam stabilizers which may be used according to the invention and of cell regulators, reaction retarders, stabilizers, flame retardants, plasticizers, dyes, fillers and fungistatic and bacteriostatic substances and the use and mode of action of these additives have been described in Kunststoff-Handbuch, Volume VII, published by Vieweg and Höchtlen, Carl-Hanser-Verlag, Munich 1966, e.g. on pages 103 to 113.

When using the polyamines according to the invention in the isocyanate polyaddition process, the components are reacted together by the known one-shot, prepolymer or semiprepolymer process, in many cases using mechanical devices such as those described in U.S. Pat. No. 2,764,565. Processing apparatus of the kind which may be used according to the invention have been described in Kunststoff-Handbuch, Volume VII, published by Vieweg and Höchtlen, Carl-Hanser-Verlag, Munich 1966, e.g. on pages 121 to 205.

When producing foams according to the invention, the foaming reaction is often carried out in molds. The reaction mixture is introduced into a mold which may be made of a metal such as aluminum or a plastics material such as an epoxide resin and it foams up inside the mold to give rise to the molded article. This foaming process may be carried out so that the molded product has a cellular structure on its surface or it may be carried out to produce a product with a non-cellular skin and cellular core. According to the invention, the quantity of foamable reaction mixture introduced into the mold may be just sufficient to fill the mold with foam or if desired, a larger quantity of foamable reaction mixture may be used, in which case the foaming process is said to be carried out under conditions of "overcharging." This procedure has already been described, for example, in U.S. Pat. Nos. 3,178,490 and 3,182,104.

When foaming is carried out inside molds, so-called external mold release agents known per se, such as silicone oils, are frequently used. Alternatively, so-called internal mold release agents may be used, optionally in combination with external mold release agents, for example, as disclosed in German Offenlegungsschriften Nos. 2,121,670 and 2,307,589.

Cold setting foams may also be produced according to the invention as described in see British Pat. No. 1,162,517 and German Offenlegungsschrift No. 2,153,086.

Foams may, of course, also be produced by the process of block foaming or by the laminator process known per se.

The following Examples serve to explain the process of the invention. The figures given refer to parts by weight or percentages by weight unless otherwise indicated.

EXAMPLE 1

A solution of 234 g of 1-aminohexanol

HO—(CH$_2$)$_6$—NH$_2$ in 400 ml of methyl isobutyl ketone is boiled under reflux using a water separator until about 36 ml of water have been removed. The excess ketone is then distilled off at reduced pressure. The resulting hydroxy ketimine

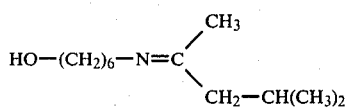

is slowly added at temperatures of between 20° C. and 30° C. to 2340 g of an isocyanate prepolymer having an isocyanate content of 3.5% (the isocyanate prepolymer was prepared by known methods from a bifunctional polypropylene glycol (OH number 56) and hexamethylene diisocyanate). The OH/NCO reaction is catalyzed by the addition of 1 g of tin-(II) octoate.

When the addition reaction has been completed, as indicated by IR spectroscopy, the reaction mixture is heated to a temperature of between 110° C. and 120° C. and steam distilled until no ketone can be detected in the distillate. The residue is then rapidly heated to 130° C. and the slight residue of water is distilled off, using an oil pump vacuum. After about 30 minutes, the reaction mixture left behind contains less than 0.1% of water. The resulting product is a higher molecular weight diamine which has mainly the following end groups:

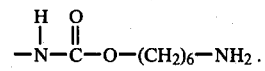

EXAMPLE 2

230 g of tne hydroxyaldimine of the following formula

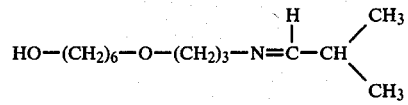

are added over a period of one hour at temperatures of about 40° C. to 1200 g of an isocyanate prepolymer having an isocyanate content of 3.5% which has been prepared by known methods of reacting a polypropylene glycol (having a hydroxyl number of 56 and a molecular weight of 2900 which had been prepared from trimethylolpropane and propylene glycol) with 1-isocyanato-3,3,5-trimethyl-5-isocyanatomethyl-cyclohexane.

The hydroxyaldimine was obtained by the introduction of 175 g of 1,6-hexanediol-1(-3-aminopropylether) into 150 ml of isobutyraldehyde, followed by boiling under reflux and separation of water. The excess aldehyde was then distilled off at reduced pressure.

The reaction of the hydroxyaldimine with the isocyanate prepolymer is catalyzed with 0.8 g of tin-(II) octoate. The resulting prepolymer which has aldimine end groups is treated as described in Example 1. A prepolymer with the following end groups is obtained:

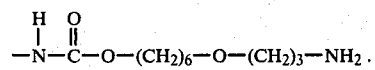

EXAMPLE 3

243 g of the following ketimine

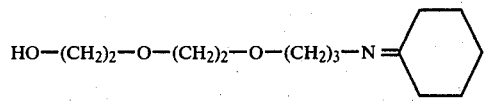

are slowly added at temperatures below 40° C. to 1900 g of an isocyanate prepolymer (2.2% NCO) which has been obtained by known methods of reacting a copolymer of propylene oxide and ethylene oxide which has been started on trimethylol propane and has a hydroxyl number of 35 with tolylene diisocyanate.

The ketimine was obtained by introducing 163 g of diethylene glycol-(3-propylamine)-ether

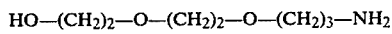
HO—(CH$_2$)$_2$—O—(CH$_2$)$_2$—O—(CH$_2$)$_3$—NH$_2$ into a mixture of 105 g of cyclohexanone and 200 ml of toluene and then boiling the reaction product, using a water separator. When about 18 ml of water had been removed in this way, the carrier agent and excess ketone were removed under vacuum.

The reaction between isocyanate prepolymer and hydroxyketimine is catalyzed by the addition of 2 g of dibutyltin dilaurate. The ketimine prepolymer is then decomposed as in Example 1.

A polyfunctional amino prepolymer having the following end groups

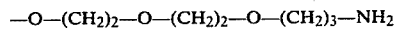
—O—(CH$_2$)$_2$—O—(CH$_2$)$_2$—O—(CH$_2$)$_3$—NH$_2$ is obtained.

EXAMPLE 4

186 g of the hydroxyaldimine of the formula

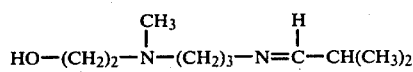
$$\text{HO—(CH}_2)_2\text{—}\overset{\overset{\text{CH}_3}{|}}{\text{N}}\text{—(CH}_2)_3\text{—N}=\overset{\overset{\text{H}}{|}}{\text{C}}\text{—CH(CH}_3)_2$$

are added at room temperature, together with 2 g of tin-(II) octoate, to 2450 g of an isocyanate prepolymer which has an isocyanate content of 3.4% and which was obtained by known methods from a bifunctional polypropylene glycol (hydroxyl number 56) and hexamethylene diisocyanate.

The blocked amine of the above formula was obtained by introducing 132 g of N-methyl-N-(3-aminopropyl)-ethanolamine of the formula

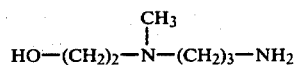
$$\text{HO—(CH}_2)_2\text{—}\overset{\overset{\text{CH}_3}{|}}{\text{N}}\text{—(CH}_2)_3\text{—NH}_2$$

into a mixture of 150 ml of isobutyraldehyde and 150 ml of cyclohexane and then boiling under reflux, using a water separator. When condensation had been completed, all the readily volatile constituents were distilled off and the hydroxyaldimine was used as described.

The reaction of the isocyanate prepolymer with the masked amine is followed by IR spectroscopy. When the isocyanate band has disappeared, the reaction mixture is heated to a temperature of from 105° C. to 115° C. and steam treated with vigorous stirring until no more aldehyde can be detected in the distillate. The residue is then heated to 130° C. for 30 minutes in an oil pump vacuum. A prepolymer having the following end groups is obtained:

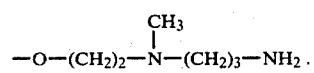
$$-\text{O—(CH}_2)_2\text{—}\overset{\overset{\text{CH}_3}{|}}{\text{N}}\text{—(CH}_2)_3\text{—NH}_2 .$$

EXAMPLE 5

132 g of N-methyl-N-(3-aminopropyl)-ethanolamine

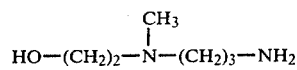
$$\text{HO—(CH}_2)_2\text{—}\overset{\overset{\text{CH}_3}{|}}{\text{N}}\text{—(CH}_2)_3\text{—NH}_2$$

are slowly added dropwise with stirring to a mixture of 106 g of freshly distilled benzaldehyde and 200 ml of toluene. When all the ethanolamine has been added, the mixture is boiled under reflux, using a water separator, until about 18 ml of water have been removed. When condensation has been completed, the carrier agent is removed by means of a rotary evaporator.

The crude hydroxybenzaldimine of the formula

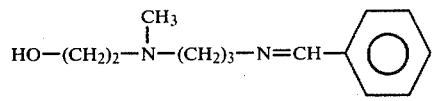
$$\text{HO—(CH}_2)_2\text{—}\overset{\overset{\text{CH}_3}{|}}{\text{N}}\text{—(CH}_2)_3\text{—N}=\text{CH—}\langle\text{O}\rangle$$

is introduced into a reaction vessel and 1200 g of the isocyanate prepolymer used in Example 2 is slowly added at room temperature with vigorous stirring together with 2 g of dibutyl tin dilaurate. When the isocyanate band in the IR spectrum has disappeared, the product is steam distilled and dried as described in Example 1. A polyfunctional prepolymer having the following end groups

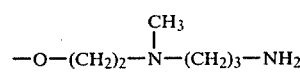
$$-\text{O—(CH}_2)_2\text{—}\overset{\overset{\text{CH}_3}{|}}{\text{N}}\text{—(CH}_2)_3\text{—NH}_2$$

is thus obtained.

EXAMPLE 6

130 g of N-β-hydroxyethylpiperazine are slowly added dropwise to a mixture of 80 g of isobutyraldehyde and 200 ml of cyclohexane. The reaction mixture is then boiled under reflux, using a water separator, until about 18 ml of water have been removed. The carrier agent and excess aldehyde are distilled off at reduced pressure.

184 g of the resulting hydroxyenamine of the formula

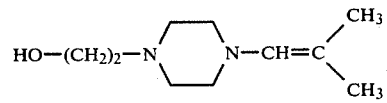
$$\text{HO—(CH}_2)_2\text{—N}\diagup\diagdown\text{N—CH}=\text{C}\diagup^{\text{CH}_3}_{\text{CH}_3}$$

are slowly added dropwise at temperatures of between 30° C. and 40° C. to 1900 g of the isocyanate prepolymer used in Example 3, to which 2 g of tin octoate have been added. When the addition reaction has been completed, hydrolytic decomposition of the polyenamine and dehydration are carried out as indicated in Example 1.

The product obtained is a higher molecular weight polyamine having the following end groups:

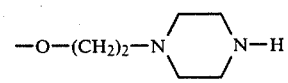
$$-\text{O—(CH}_2)_2\text{—N}\diagup\diagdown\text{N—H}$$

EXAMPLE 7

80 Parts by weight of a polypropylene-polyethylene oxide which has been started on trimethylolpropane and has the hydroxyl number 35 are mixed with 20 parts by weight of the polyamine prepared in Example 4 and the mixture is foamed up in an open cardboard box with 51 g of tolylene diisocyanate (65% 2,4-isomer, 35% 2,6-isomer) with the addition of 4.5 parts of water, 1.2 parts of a polyether siloxane and 0.15 parts of tin octoate. An open celled polyurethane-polyurea foam having the following properties is obtained:

| Density | 35 kg/m$^3$ | (DIN 53 420) |
|---|---|---|
| Tensile strength | 125 k Pa | (DIN 53 571) |
| Elongation at break | 165% | (DIN 53 571) |
| Compression strength | 5.3 k Pa | (DIN 53 577 |

What is claimed is:

1. A process for the production of polyurethane resins wherein polyamines which correspond to the general formula

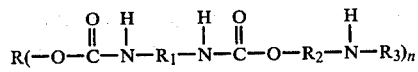

are reacted with organic diisocyanates and/or polyisocyanates wherein n represents an integer of between 2 and 10, R represents an n-valent organic group such as can be obtained by the removal of n hydroxyl groups from a polyhydroxyl compound which has an average molecular weight of between about 200 and about 10,000 and which may contain urethane groups, $R_1$ represents an alkylene, cycloalkylene, arylene or aralkylene group having 2 to 15 carbon atoms and $R_2$ represents an alkylene, cycloalkylene, arylene or aralkylene group having from 2 to 15 carbon atoms and $R_3$ represents hydrogen or an alkyl or cycyloalkyl group having from 1 to 9 carbon atoms or it represents an alkylene group which together with $R_2$ and —NH— forms a 5-membered or 6-membered [heterocyclic] ring.

2. The process of claim 1 wherein $R_2$ represents an alkylene, cycloalkylene, arylene or aralkylene group having from 6 to 12 carbon atoms.

3. The process of claim 1 wherein said $R_2$ groups optionally contain —O— or

groups.